United States Patent
Pierce

(10) Patent No.: US 11,129,472 B1
(45) Date of Patent: Sep. 28, 2021

(54) MOBILE DEVICE HOLDER

(71) Applicant: Carrick J. Pierce, New York, NY (US)

(72) Inventor: Carrick J. Pierce, New York, NY (US)

( * ) Notice: Subject to any disclaimer, the term of this patent is extended or adjusted under 35 U.S.C. 154(b) by 0 days.

(21) Appl. No.: 17/092,121

(22) Filed: Nov. 6, 2020

Related U.S. Application Data

(60) Continuation-in-part of application No. 16/421,830, filed on May 24, 2019, now Pat. No. 10,863,868, and a continuation-in-part of application No. 16/933,340, filed on Jul. 20, 2020, now Pat. No. 10,863,823, which is a continuation-in-part of application No. 16/844,313, filed on Apr. 9, 2020, now Pat. No. 10,716,396, which is a division of application No. 16/421,869, filed on May 24, 2019, now Pat. No. 10,631,634.

(51) Int. Cl.
| | | |
|---|---|---|
| A47B 43/00 | (2006.01) | |
| A47G 29/08 | (2006.01) | |
| A47B 87/00 | (2006.01) | |
| A47F 7/28 | (2006.01) | |
| A47B 81/00 | (2006.01) | |
| A47G 23/02 | (2006.01) | |
| A47B 73/00 | (2006.01) | |
| H04M 1/04 | (2006.01) | |
| H04M 1/11 | (2006.01) | |
| B60R 11/02 | (2006.01) | |

(52) U.S. Cl.
CPC .......... *A47B 43/00* (2013.01); *A47B 73/008* (2013.01); *A47B 81/00* (2013.01); *A47B 87/007* (2013.01); *A47F 7/28* (2013.01); *A47G 23/0216* (2013.01); *A47G 29/08* (2013.01); *H04M 1/04* (2013.01); *H04M 1/11* (2013.01); *A63B 2225/685* (2013.01); *B60R 11/0241* (2013.01)

(58) Field of Classification Search
CPC ......... A47J 47/16; A47F 5/0037; A47F 7/283; A47F 7/28; A47G 23/0216; A47G 29/08; A47B 81/00; A47B 73/008; A47B 87/007; A47B 43/00; A47B 73/00; B60R 11/0241; H04M 1/04; H04M 1/11; H04M 17/026; A63B 2225/685; A45F 2200/0516
See application file for complete search history.

(56) References Cited

U.S. PATENT DOCUMENTS

| | | |
|---|---|---|
| 1,378,902 A | 5/1921 | Roehl |
| 1,738,821 A | 12/1929 | Gibson |
| 1,894,185 A | 1/1933 | Martin |
| D125,285 S | 2/1941 | Ohlhaver |
| D137,129 S | 1/1944 | O'Connell et al. |

(Continued)

*Primary Examiner* — Ko H Chan
(74) *Attorney, Agent, or Firm* — Goldstein Law Offices, P.C.

(57) ABSTRACT

A mobile device holder comprising a backing panel and a basket portion, the backing panel has a selectively attachable mounting panel assembly adapted to detachably secure the mobile device holder to a vertical mounting surface, the basket portion projects forwardly from the backing panel and is adapted to receive and retain a mobile device and mate said mobile device with a charging plug. A contiguous modular arrangement of multiple mobile devices positioned in a column configuration allows multiple mobile devices to be stored, while the basket portion is tilted forwardly to prevent the obstruction of basket openings when the mobile device holders are vertically stacked in the column configuration.

17 Claims, 13 Drawing Sheets

(56) References Cited

U.S. PATENT DOCUMENTS

| | | |
|---|---|---|
| 2,649,270 A | 8/1953 | Franks |
| D175,159 S | 7/1955 | Dunkle |
| 2,982,423 A | 5/1961 | Handler et al. |
| 3,581,906 A | 6/1971 | Joyce |
| 4,064,992 A | 12/1977 | Ralston et al. |
| 4,131,203 A | 12/1978 | Bridges |
| D251,352 S | 3/1979 | Menius |
| 4,160,570 A | 7/1979 | Bridges |
| 4,378,889 A | 4/1983 | Lebowitz |
| 4,434,961 A | 3/1984 | Hoye |
| 4,955,488 A | 9/1990 | Nicoll |
| 5,024,337 A | 6/1991 | Bailey |
| D340,622 S | 10/1993 | Park et al. |
| 5,342,009 A | 8/1994 | Lehner |
| D355,336 S | 2/1995 | Dickey et al. |
| 5,390,801 A | 2/1995 | Hansen |
| D402,512 S | 12/1998 | Lee et al. |
| 5,855,282 A | 1/1999 | Hardy |
| 6,045,017 A | 4/2000 | Connell |
| 6,047,937 A | 4/2000 | Huang |
| 6,092,672 A | 7/2000 | Harris et al. |
| 6,427,960 B1 | 8/2002 | Gehring et al. |
| 6,435,633 B2 | 8/2002 | Hoshi |
| 6,808,149 B1 | 10/2004 | Sendowski et al. |
| D509,354 S | 9/2005 | Tannenhauser |
| D509,691 S | 9/2005 | Doran |
| 7,300,031 B2 | 11/2007 | Bertsch et al. |
| 7,527,158 B2 | 5/2009 | Gainer et al. |
| 7,562,853 B2 | 7/2009 | Mazzola |
| 8,245,894 B2 | 8/2012 | Buehler |
| 8,439,209 B2 | 5/2013 | Strollo |
| D711,189 S | 8/2014 | Everard et al. |
| 8,851,436 B2 | 10/2014 | Adachi et al. |
| 9,241,554 B1 | 1/2016 | Tong |
| 9,282,842 B1 | 3/2016 | Brooks |
| 9,295,320 B1 | 3/2016 | McManus |
| 9,516,941 B1 | 12/2016 | Moulton |
| D801,177 S | 10/2017 | Gillespie |
| D846,300 S | 4/2019 | Morales |
| 10,272,812 B2 | 4/2019 | Ghannam et al. |
| 10,425,517 B2 * | 9/2019 | Brewer ................ H04B 1/3888 |
| D868,048 S | 11/2019 | Kepniss et al. |
| D868,547 S | 12/2019 | Moore |
| 10,631,634 B1 * | 4/2020 | Pierce ................ A47G 23/0216 |
| 10,716,396 B1 * | 7/2020 | Pierce .................... A47B 43/00 |
| 2003/0038100 A1 | 2/2003 | Liu |
| 2014/0360955 A1 | 12/2014 | Presenty |
| 2016/0109176 A1 | 4/2016 | Harms |
| 2017/0325559 A1 | 11/2017 | Johnson |
| 2019/0174914 A1 * | 6/2019 | Gallup ................... A47B 23/04 |

\* cited by examiner

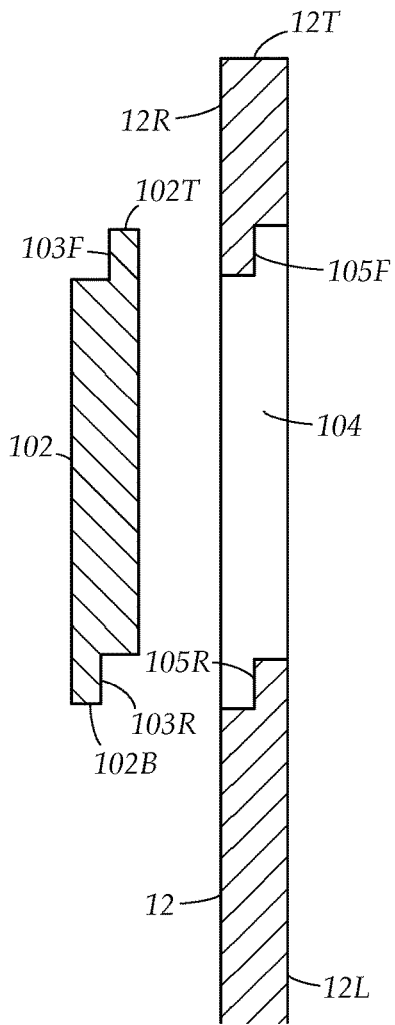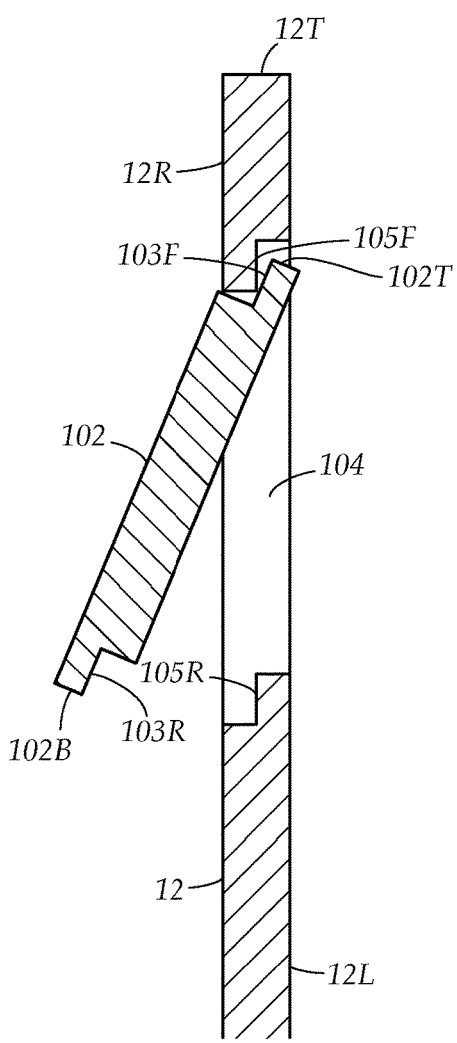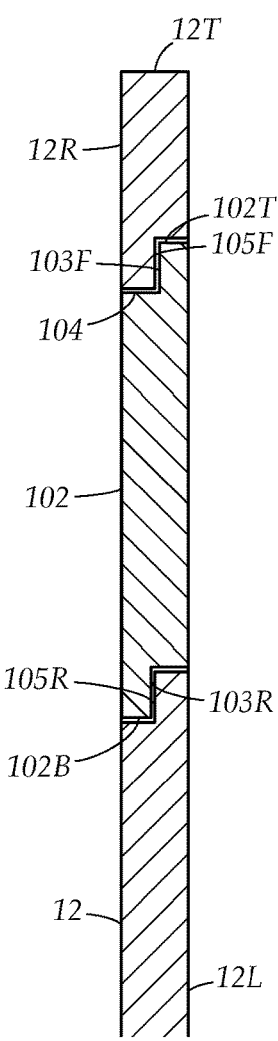
FIG. 8A
FIG. 8B
FIG. 8C

MOBILE DEVICE HOLDER

This application is continuation in part of U.S. patent application Ser. No. 16/421,830, filed on May 24, 2019, from which priority is claimed and the contents of which are relied upon and incorporated herein by reference in their entirety. This application is also a continuation in part of U.S. patent application Ser. No. 16/933,340, filed on Jul. 20, 2020 which is a continuation in part of U.S. patent application Ser. No. 16/844,313, filed on Apr. 9, 2020 and was issued as U.S. Pat. No. 10,716,396 on Jul. 21, 2020, which is a division of U.S. patent application Ser. No. 16/421,869, filed on May 24, 2019 and issued as U.S. Pat. No. 10,631,634 on Apr. 28, 2020, from which priority is claimed and the contents of which are relied upon and incorporated herein by reference in their entirety. The entire disclosure of any publication or patent document mentioned herein is entirely incorporated by reference.

TECHNICAL FIELD

The present disclosure relates generally to a repositionable holder for storing mobile devices. More particularly, the present disclosure relates to a mobile device holder which is detachably secured to a mounting surface.

BACKGROUND

Mobile electronic devices generally need to be charged at least daily to remain operative. When used frequently, however, such devices need to be charged more than once a day. Since charging a device generally involves connecting it to a power outlet, it can be challenging to retain access to the device while charging.

A common solution to keep a mobile device accessible while charging is to leave it on a desk or tabletop surface. When left on such a surface, it is very easy to trip over the charging cable and knock the device to the floor, often cracking the screen or causing other physical damage.

Therefore, a need exists for a mobile device holder capable of being detachably secured to a mounting surface, which is further capable of holding mobile devices of any shape and size, and does not obstruct the insertion or removal of mobile devices when multiple mobile device holders are vertically stacked upon the mounting surface.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a holder capable of receiving and storing a mobile device, which is further capable of being detachably secured to a ferrous vertical mounting surface. Accordingly, the present disclosure provides a mobile device holder comprising a backing panel and a basket portion, the basket portion is adapted to receive and store the mobile device, while the backing panel has a magnet mounting means adapted to detachably secure a mobile device holder upon the vertical mounting surface.

It is another aspect of an example embodiment in the present disclosure to provide a holder capable of being combined with other holders to store a plurality of mobile devices. Accordingly, the present disclosure provides a mobile device holder whereby the backing panel has top and lower edges and sides extending therebetween, allowing multiple mobile device holders to be contiguously aligned in a column configuration or a row configuration.

It is yet another aspect of an example embodiment in the present disclosure to provide a holder which allows mobile devices to be inserted or removed without obstruction when the mobile device holders are positioned in the column configuration. Accordingly, the present disclosure provides a mobile device holder whereby the basket portion tilts forwardly away from the backing panel, preventing the obstruction of the basket portion of the mobile device holder positioned below another mobile device holder in the column configuration.

It is a further aspect of an example embodiment in the present disclosure to provide a holder which is prevented from sliding downwardly upon the vertical mounting surface. Accordingly, the present disclosure provides a mobile device holder further comprising a friction element positioned upon the rear face of the backing panel, which is adapted to frictionally engage the vertical mounting surface to prevent the mobile device holder from sliding downwardly.

It is yet a further aspect of an example embodiment in the present disclosure to provide a holder which can be adapted to mount on a variety of vertical mounting surfaces. Accordingly, the mounting means may include an interchangeable mounting panel that has the mounting means. The mounting means may include magnets for mounting to ferromagnetic surfaces, adhesives and hook and loop fasteners for nondestructive mounting to other surfaces, and hanger hooks or the like.

The present disclosure describes a mobile device holder comprising a backing panel and a basket portion, the backing panel has a selectively attachable mounting panel assembly adapted to detachably secure the mobile device holder to a vertical mounting surface, the basket portion projects forwardly from the backing panel and is adapted to receive and retain a mobile device and mate said mobile device with a charging plug. A contiguous modular arrangement of multiple mobile devices positioned in a column configuration allows multiple mobile devices to be stored, while the basket portion is tilted forwardly to prevent the obstruction of basket openings when the mobile device holders are vertically stacked in the column configuration.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 8A, FIG. 8B and FIG. 8C are side elevational views with parts broken away, showing just the backing panel and mounting panel, and illustrating a process of interconnection thereof.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
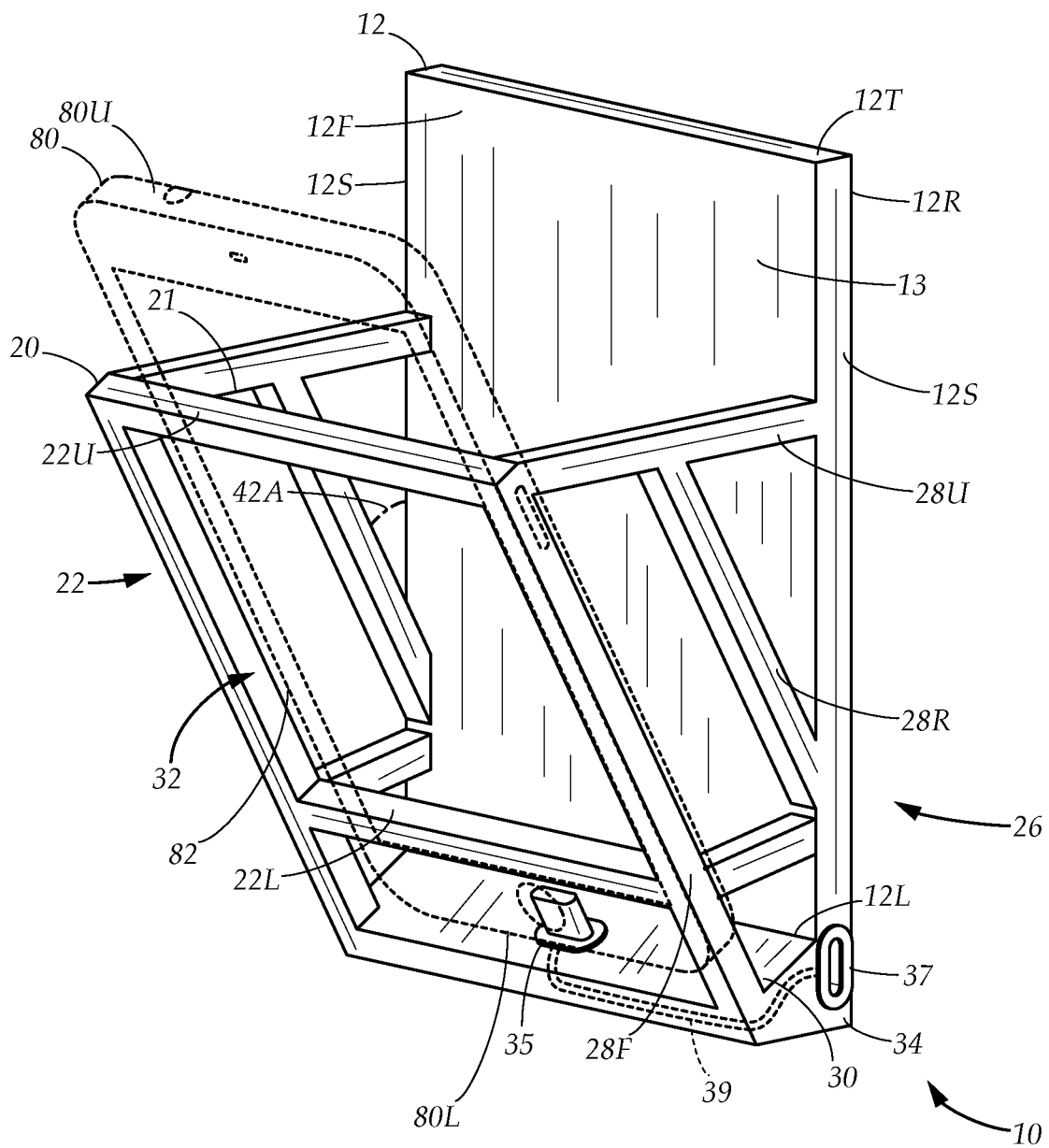
FIG. 1 is a diagrammatical depiction of a mobile device holder adapted to retain and support a mobile device, the mobile device holder having a backing panel with a basket portion projecting forwardly therefrom, in accordance with an embodiment in the present disclosure. The mobile device shown is phantom as it would be positioned when mated with the charging plug.

FIG. 1 illustrates a mobile device holder 10 comprising a backing panel 12 and a basket portion 20. The backing panel 12 has a front face 12F, a rear face 12R disposed opposite thereof, a top edge 12T, and a lower edge 12L. The backing panel 12 may further have a pair of sides 12S which extend between the top and lower edges 12T, 12L. The basket portion 20 projects from the front face 12F and tilts forwardly. The basket portion 20 has an upwardly basket opening 21 which reveals a basket retaining space 32, which is adapted to receive and retain a mobile device 80. The mobile device 80 has a generally rectangular prism shape, is taller than it is wide, and is much wider than it is thick. The mobile device 80 may have a mobile device upper portion 80U, a mobile device lower portion 80L, and a mobile device body 82 which extend therebetween. The mobile device body 82 has a charging port at the lower portion.

Figure 3:
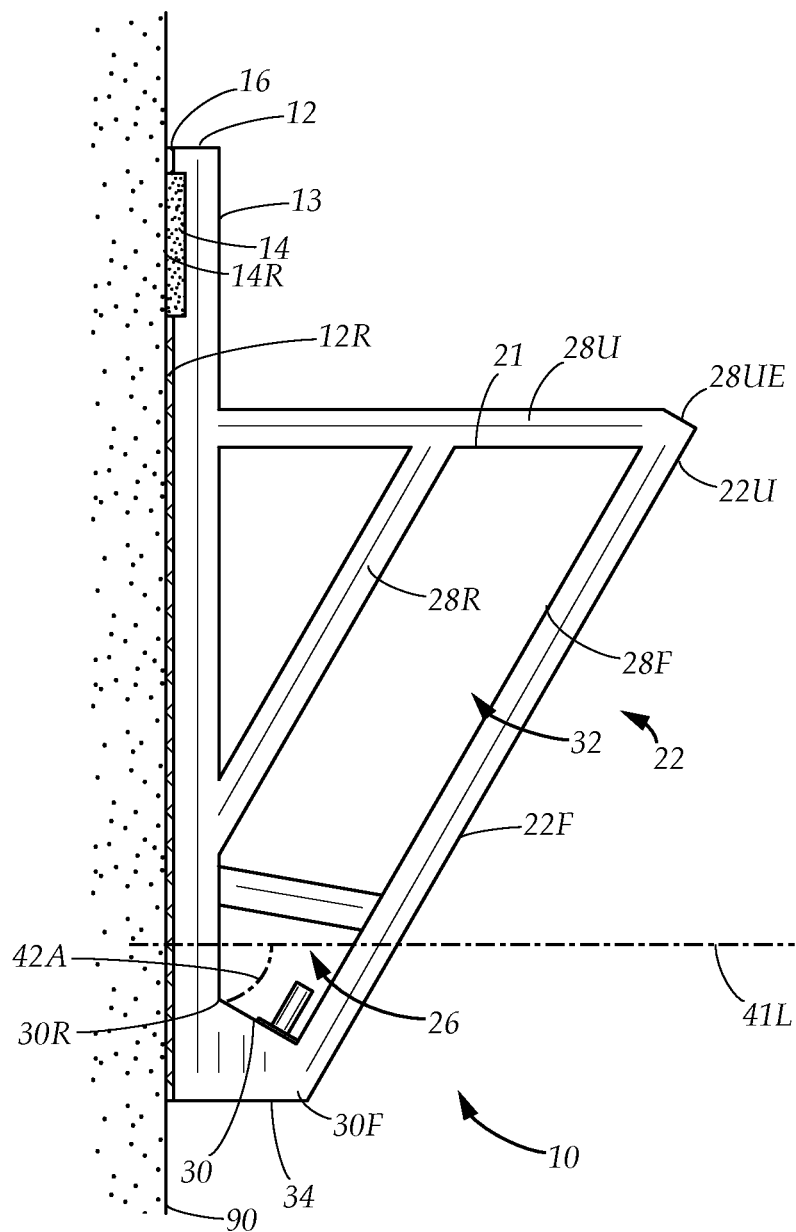
FIG. 3 is a diagrammatical cross section view of the mobile device holder viewed from the side, showing the rear panel back face in magnetic contact with a vertical mounting surface, with the frictional layer preventing the mobile device holder from sliding downwards, in accordance with an embodiment in the present disclosure.
Figure 4:
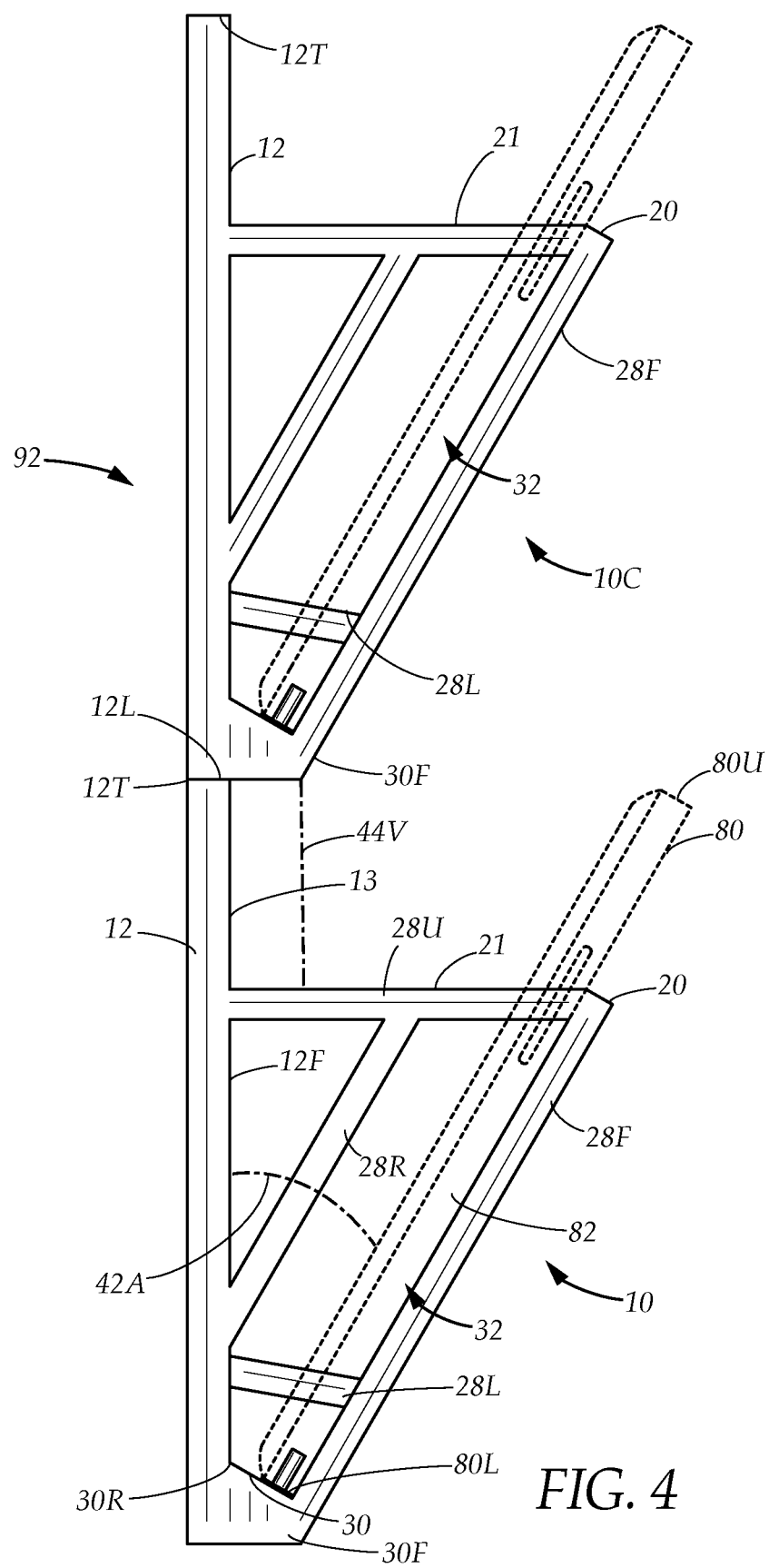
FIG. 4 is a diagrammatical side view of two mobile device holders positioned in a column configuration, whereby the basket portion of each of the mobile device holders is positioned at a basket tilt angle which allows access to the basket retaining space to remain unobstructed by the basket portion of the mobile device holder positioned above, in accordance with an embodiment in the present disclosure.

Turning briefly to FIGS. 3 and 4, the backing panel 12 is adapted to be detachably secured to a vertical mounting surface 90, allowing the mobile device holder 10 to be attached or repositioned to any point upon the vertical mounting surface 90. Furthermore, multiple mobile device holders 10 may be combined to form a contiguous modular arrangement 92 upon the vertical mounting surface 90. For example, multiple mobile device holders 10 may be employed to hold mobile devices 80 of various kinds.

Returning now to FIG. 1, the basket portion 20 further has a basket front 22 and a pair of basket sides 26. The basket sides 26 project forwardly from the front face 12F, while the basket front 22 is located distally from the front face 12F, extending laterally between the basket sides 26. The basket front 22 and the basket sides 26 collectively define the basket retaining space 32 therebetween, and the basket retaining space 32 opens upwardly through the basket opening 21. The basket portion 20 further has a basket base panel 30 located distally from the basket opening 21 towards the backing panel lower edge 12L. The mobile device holder 10 has a charging plug 35 substantially centered on the basket base panel 30. The charging plug 35 is a male connector that is configured to mate with the mobile device. Accordingly, the charging plug may be a USB-C, mini or micro USB, lightening, or any other connector having a suitable shape and configuration for mating with and charging the intended mobile device 80. Note that a charger receptacle 37 is provided on one of the sides 12S. The charger receptacle 37 is a female outlet that is electrically connected to the charging plug 35 with a connection cable 39 such that a charger cable that is compatible with the mobile device 80 is mated with the charger receptacle to thereby power the charging plug 35.

The mobile device 80 is placed within the basket retaining space 32 by inserting the mobile device lower portion 80L downwardly through the basket opening 21 until the mobile device lower portion rests upon the base panel 30 and the mobile device 80 mates with the charging plug 35. The mobile device 80 tilts forwardly within the basket portion 20, such that the mobile device body 82 rests upon the basket front 22. The basket portion 20 is capable of retaining mobile devices 80 of any shape, as long as the mobile device lower portion 80L rests upon the basket base panel 30 and the mobile device 80 is prevented from falling out of the basket retaining space 32 by the basket front 22 and/or basket sides 26.

Figure 2:
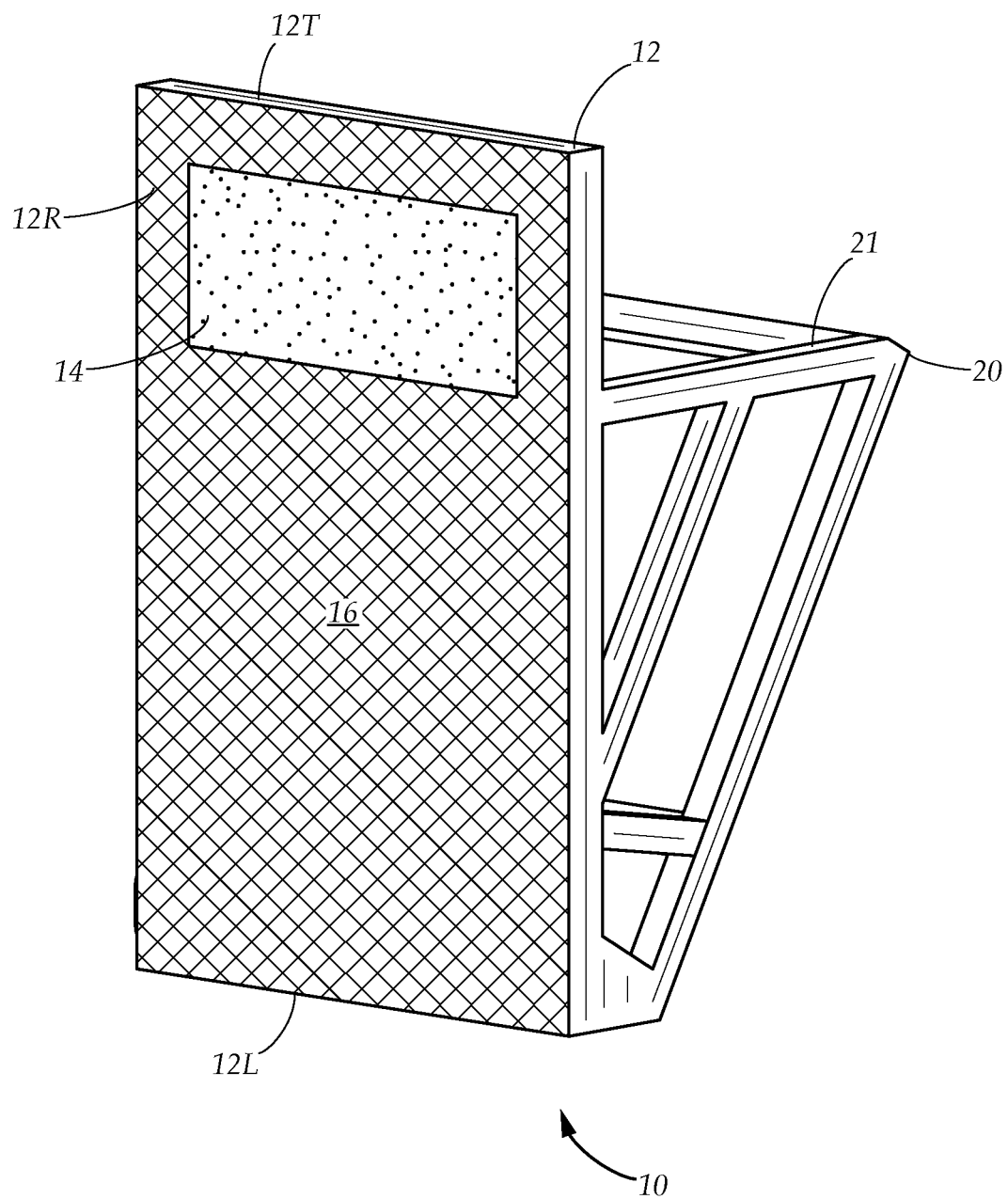
FIG. 2 is a diagrammatical depiction of the mobile device holder viewed from the rear, showing the backing panel rear face with a magnet and a friction element, in accordance with an embodiment in the present disclosure.

Turning now to FIG. 2 while also referring to FIG. 3, the rear face 12R of the backing panel 12 is adapted to be attached to the vertical mounting surface 90. In a preferred embodiment, the rear face 12R of the backing panel 12 has a mounting means comprising a magnet 14, and the vertical mounting surface 90 may be a refrigerator door, metal cabinet, or other surface formed using ferrous materials, to which the magnet 14 may detachably adhere. The rear face 12R of the backing panel 12 may also have a magnet retention slot 14R which is adapted to retain the magnet 14 and allow the magnet to 14 remain flush with the rear face 12R. The magnet retention slot 14R and/or the magnet 14 may be positioned proximate to the top edge 12T of the backing panel 12. The rear face 12R of the backing panel may further have a friction element 16 which is adapted to contact and frictionally engage the vertical mounting surface 90 to prevent the mobile device holder 10 from being pulled downward by gravity. The friction element 16 may be implemented using rubber, friction tape, or any other similar material which is thin and has high frictional properties. In one embodiment, the friction element 16 may be positioned between the magnet 14 and the lower edge 12L of the backing panel 12. In another embodiment, the friction element 16 may cover the entirety of the rear face 12R with the exception of the magnet 14, such that the friction element 16 surrounds the magnet 14. The magnet 14 may have a thickness which allows the magnet 14 to remain flush with the friction element 16. Note that in alternate embodiments, the mounting means may be a reusable adhesive or other suitable means which allows the mobile device holder 10 be detachably secured to the vertical mounting surface 90. In certain embodiments, the mounting means may instead be used to permanently attach the mobile device holder to the vertical mounting surface 90.

Continuing to refer to FIG. 3 while also referring to FIG. 1, the basket portion 20 is tilted forwardly at a basket tilt angle 42A. The basket base panel 30 has a base panel rear edge 30R which extends horizontally across the front face 12F of the backing panel 12, and a distally oriented base panel front edge 30F. In a preferred embodiment, the base panel 30 extends away from the front face 12F of the backing panel 12, and is angled downwardly to match the basket tilt angle 42A. The basket sides 26 each have an upper side support 28U which projects away from the front face 12F of the backing panel, and each upper side support 28U has an upper side support end 28UE which terminates distally from the front face 12F of the backing panel 12. The basket front 22 has a pair of front side supports 28F, which extend from the upper side support end 28UE of each basket side 26 to the base panel front edge 30F, thus joining each basket side 26 to the basket base panel 30. To enclose the basket front 22 and retain the mobile device 80 within the basket retaining space 32, the basket front 22 further has a front upper support 22U which extends horizontally between each of the upper side support ends 28UE. The basket opening 21 may therefore be defined by the upper side supports 28U and the front upper support 22U. Furthermore, the basket front 22 may also have a front lower support 22L which extends horizontally between the front side supports 28F at a position between the front upper support 22U and the base panel front edge 30F. Referring also to FIG. 4, the basket sides 26 may each have a lower side support 28L positioned between the upper side support 28U and the basket base panel 30, which extends from the front face 12F of the backing panel 12 to connect with the basket front 22. In certain embodiments, the basket portion 20 may also have a pair of rear side supports 28R which extend between the upper side supports 28U and the lower side supports 28L.

In a preferred embodiment, the basket tilt angle 42A is approximately thirty degrees in relation to a horizontal line 41L drawn perpendicularly in relation to the backing panel 12. The basket base panel 30 therefore projects away from the backing panel 12 at an angle of approximately 30 degrees in relation to the horizontal line 41L, when the horizontal line 41L extends through the base panel rear edge. The front side support 28F is oriented perpendicularly in relation to the basket base panel 30. When the mobile device 80 is retained within the basket retaining space 32, the mobile device lower portion 80L rests upon the basket base panel 30 while the mobile device body 82 is supported by the front upper support 22U and/or the front lower support 22L of the basket front 22, thus ensuring that the mobile device 80 is held at an angle of approximately thirty degrees in relation to the backing panel 12, equal to the basket tilt angle 42A.

Referring to FIG. 4 while also referring to FIGS. 1 and 3, the mobile device holder 10 may be combined with a substantially identical second mobile device holder 10C to form a contiguous modular arrangement 92 upon the vertical mounting surface 90. For example, the mobile device holder may be vertically stacked to form a column configuration, where the mobile device holder 10 is positioned below the second mobile device holder 10C, with the top edge 12T of the mobile device holder 10 in contact with the lower edge 12L of the second mobile device holder 10C. Alternatively, the mobile device holder 10 may be placed alongside the second mobile device holder 10C to create a horizontal configuration, whereby one of the sides 12S of the mobile device holder 10 is in contact with one of the sides 12S of the second mobile device holder 10C. The contiguous modular arrangement 92 of mobile device holders 10 allows for efficient and flexible use of the vertical mounting surface 90 to store multiple mobile devices 80. The top and lower edges 12T, 12L and sides 12S of the backing panel 12 ensure that the mobile device holders 10 within the contiguous modular arrangement 92 are consistently aligned.

Furthermore, the basket tilt angle 42A ensures that the basket portion 20 of the second mobile device holder 100 does not obstruct the insertion or removal of the mobile device 80 through the basket opening 21 of the mobile device holder 10 positioned therebelow in the column configuration. The base panel front edge 30F of the second mobile device holder 10C is therefore separated from the basket opening 21 of the mobile device holder 10 by a vertical distance 44V sufficient to prevent the obstruction of the basket opening 21.

The backing panel 12 may further have a backing panel upper portion 13 which extends between the top edge 12T and the basket portion 20, and has an upper portion height. In certain embodiments, the backing panel upper portion 13 extends between the upper side supports 28U and the top edge 12T of the backing panel 12. The backing panel upper portion 13 has an upper portion height, which ensures sufficient separation between the basket portions 20 of the second mobile device holder 10C and the mobile device holder 10. In certain embodiments, where the upper side supports 28U extend perpendicularly from the backing panel 12, the upper portion height is equal to the vertical distance 44V.

Referring to FIG. 1, note that the basket portion 20 may be formed in alternate configurations in accordance with the principles of the present disclosure. The basket front 22, the basket sides 26, and the basket base panel 30 may alternatively be formed using panels, wireframes, or any other structural element suitable for achieving the purpose of supporting the mobile device 80 within the basket retaining space 32. In certain embodiments, the basket front 22, the basket sides 26, and the basket opening 21 may collectively form a "U" shape when viewed from above.

Referring to FIGS. 1 and 3, in certain embodiments, the mobile device holder 10 may further have a lower support 34 which extends from the backing panel lower edge 12L to connect with the base panel front edge 30F, thereby reinforcing and supporting the basket portion 20.

Furthermore, it is noted that the mobile device holder 10 may be attached to a surface which is not vertical, so long as the basket opening 21 is properly oriented to ensure the mobile device is retained within the basket retaining space 32.

Figure 9:
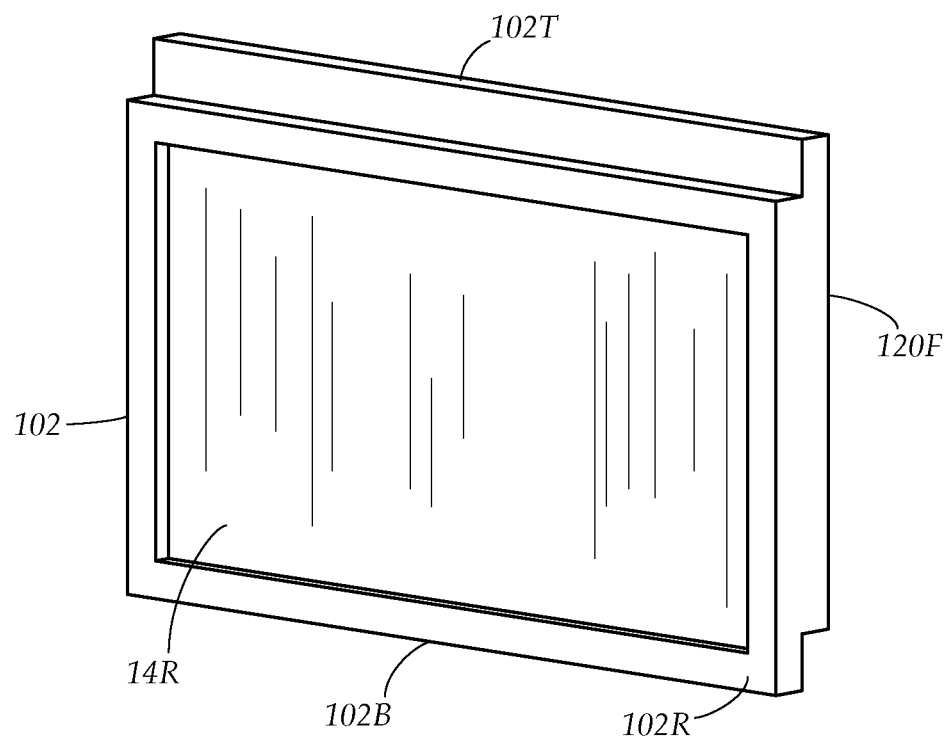
FIG. 9 is a diagrammatic depiction, illustrating the mounting panel, and showing the mounting means retention slot on a rear surface thereof.
Figure 10:
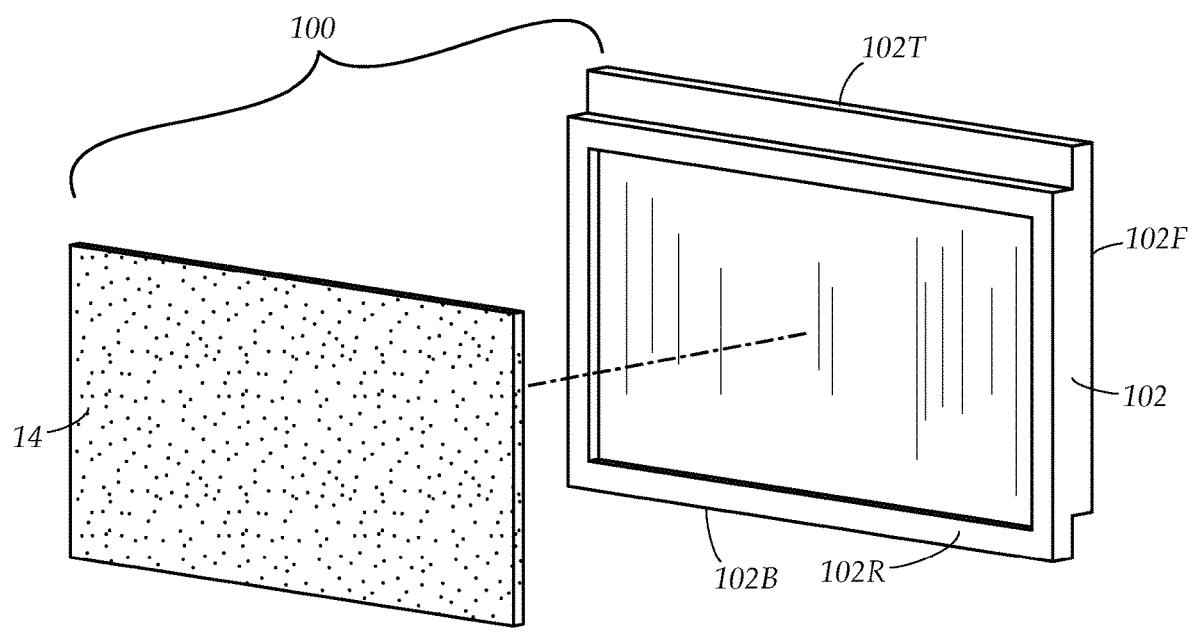
FIG. 10 is a diagrammatic depiction, similar to FIG. 9, showing the attachment of the mounting means within the mounting means retention slot.
Figure 11A:
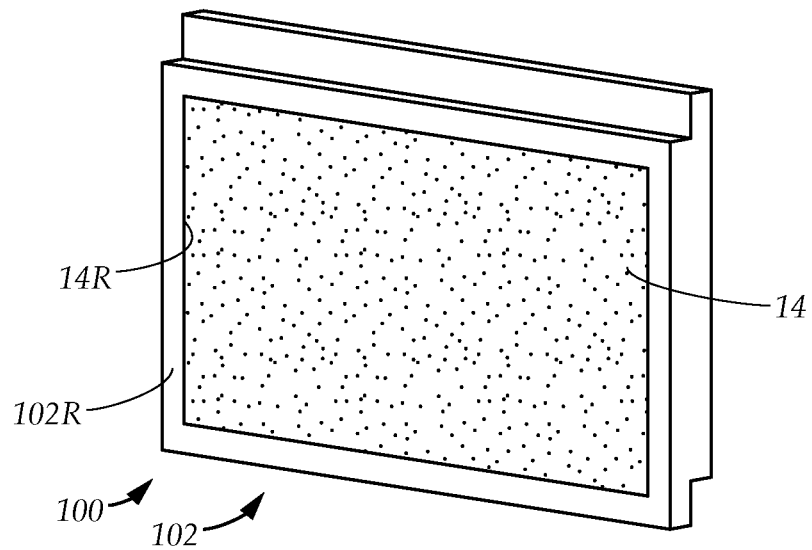
FIG. 11A is a diagrammatic depiction, showing the mounting panel, wherein the mounting means is a magnet.

FIG. 10 shows a mounting panel assembly 100, including a mounting panel 102 and the mounting means 14. In FIG. 9 and FIG. 10, the mounting panel 102 has a front 102F, a rear 102R, a top 102T, and a bottom 102B. The mounting panel 102 has the mounting means retention slot 14R recessed slightly from the rear 102R, so that, as seen in FIG. 9, the mounting means 14 can be fastened therein, and then extends substantially coplanar with the rear 102R, as seen in FIG. 11A.

Figure 5:
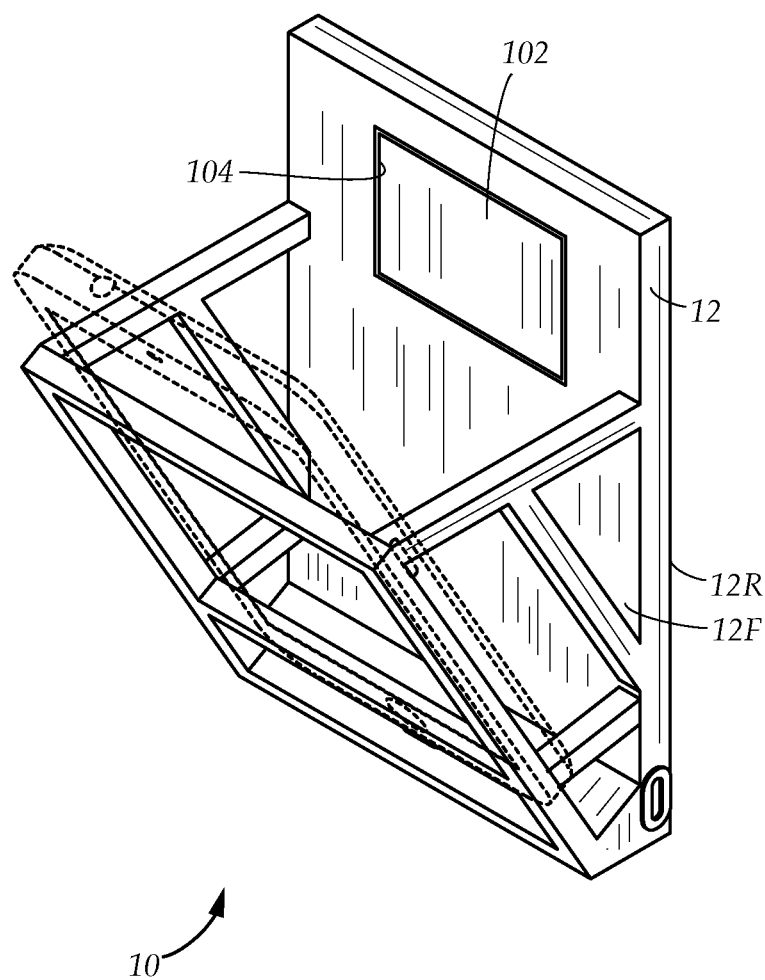
FIG. 5 is a diagrammatical depiction of a further embodiment of the mobile device holder adapted to retain and support a mobile device, wherein the backing panel has a mounting means cutout with a mounting panel attached therein, in accordance with an embodiment in the present disclosure.
Figure 6:
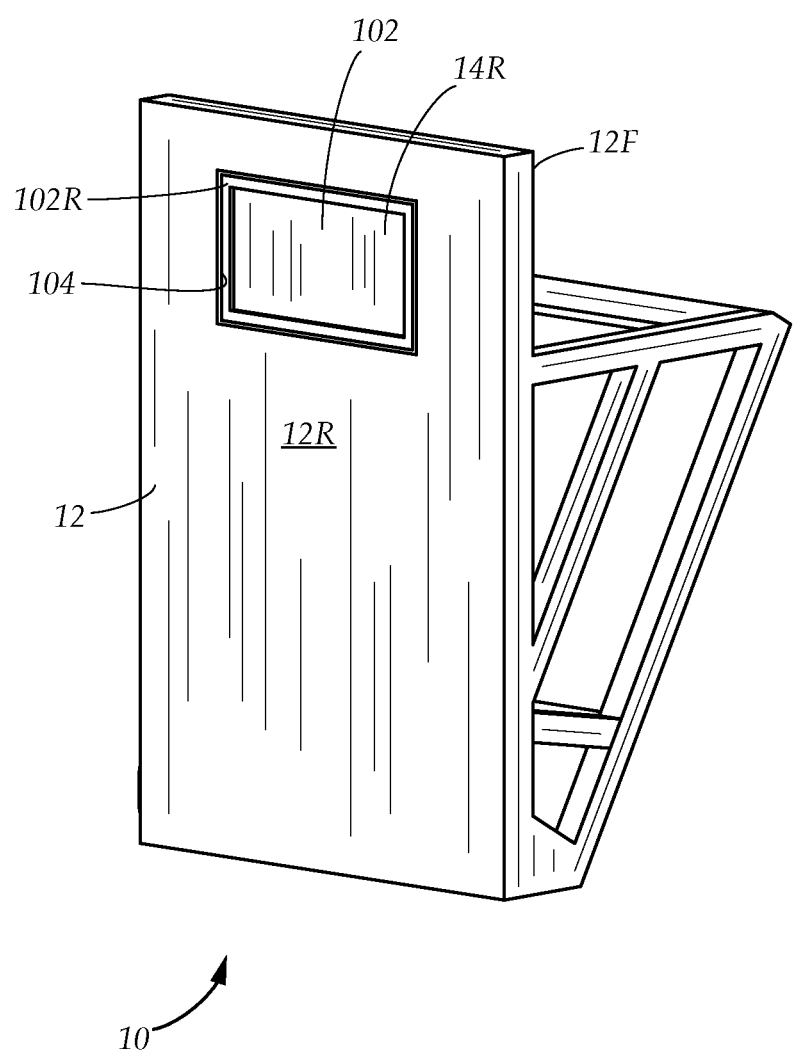
FIG. 6 is a diagrammatic depiction, similar to FIG. 5, except showing the rear of the backing panel.
Figure 7:
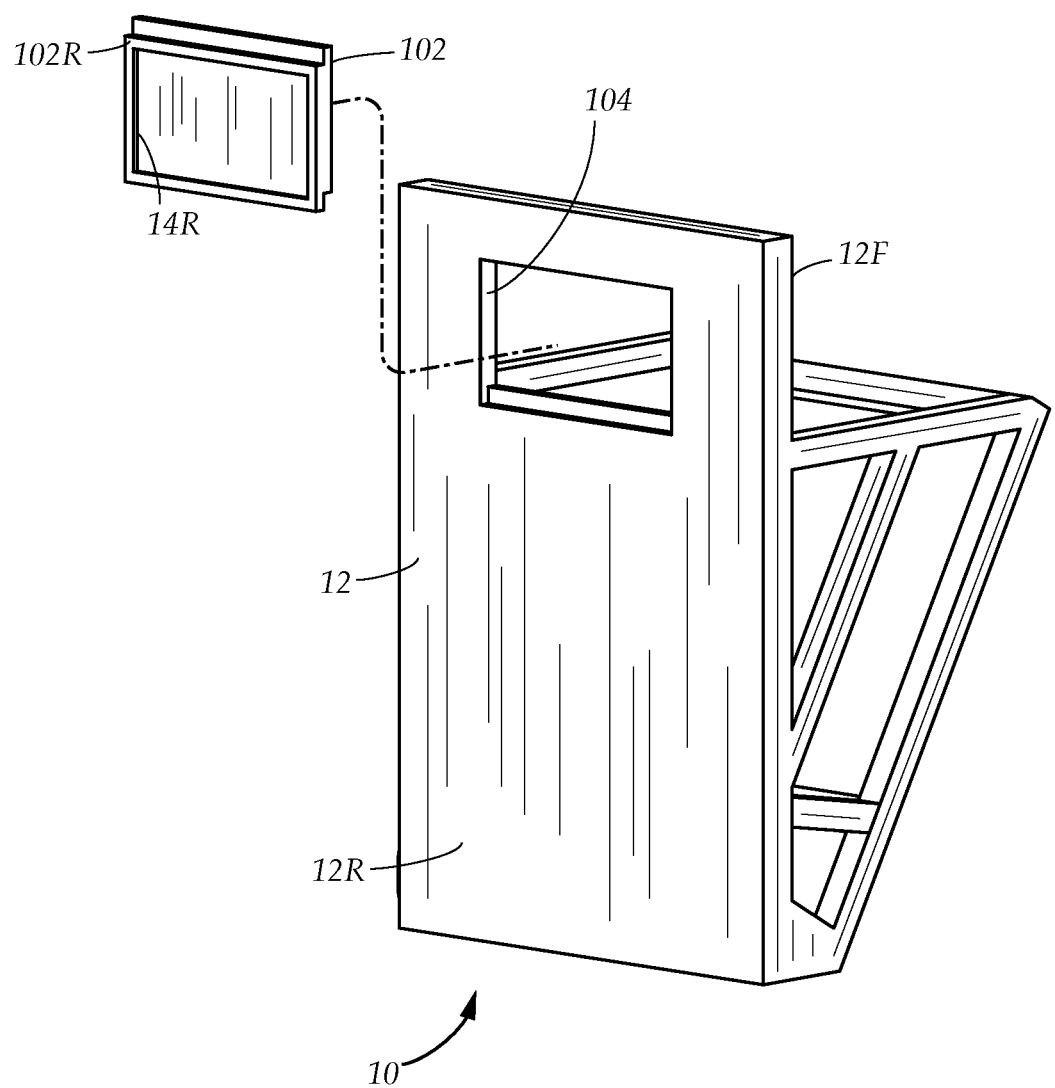
FIG. 7 is a diagrammatic exploded view, illustrating the mounting panel and the mounting cutout with which it selectively mates.

FIG. 5, FIG. 6, and FIG. 7 show an embodiment of the mobile device holder 10 wherein the mounting panel 102 is removably attached to the backing panel 12 within a mounting panel cutout 104. The mounting panel cutout 104 extends fully between the front face 12F and rear face 12R of the backing panel 12. When the mounting panel 102 is installed, the rear 102R of the mounting panel 102 is substantially coplanar with the rear face 12R of the backing panel 12. Note in FIG. 6 and FIG. 7, the mounting means retention slot 14R is unoccupied for illustrative purposes.

In the embodiment illustrated in FIG. 8A, FIG. 8B, and FIG. 8C, the mounting panel 102 may have a forward lip 103F at the top 102T and a rearward lip 103R at the bottom 102B. Also, the mounting panel cutout 104 has a forward recess 105F toward the top edge 12T and a rearward recess 105R toward the lower edge 12L. Accordingly, in an installation sequence shown by FIGS. 8A, 8B, and 8C, attachment of the mounting panel 102 to the backing panel 12 involves inserting the mounting panel 102 from the rear face 12R, inwardly and upwardly so that the forward lip 103F seats against the forward recess 105F and the rearward lip 103R seats against the rearward recess 105R. In this arrangement, the natural tendency of the backing panel 12 to pivot in a clockwise direction will tend to keep the mounting panel 102 in place. Other arrangements, structures and configurations, including latches or other mechanisms, may of course be employed to hold the mounting panel 102 securely in place during use and allow it to be easily removed when wanted.

Figure 11B:
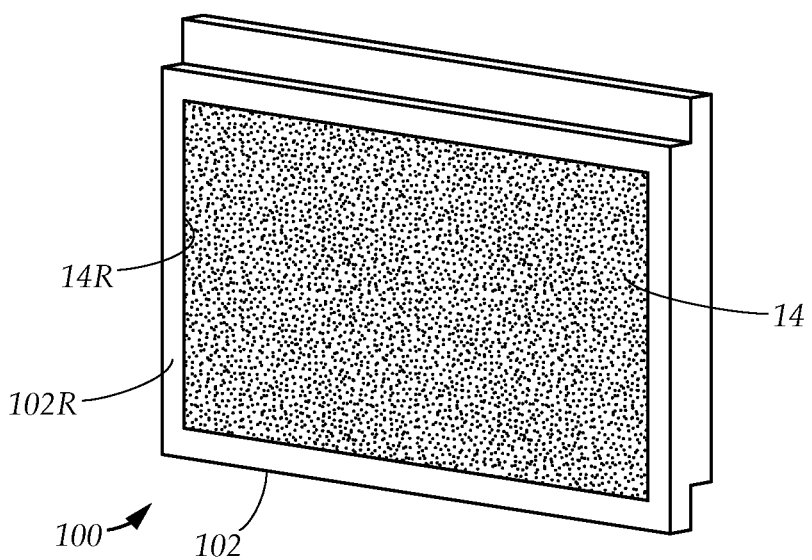
FIG. 11B is a diagrammatic depiction, showing the mounting panel, wherein the mounting means is an adhesive pad.

Advantageously, the easy removal and secure attachment of the mounting panel 102 allows the mounting panel 102 to be easily interchanged. In particular, FIG. 11A through FIG. 11F show various embodiments of the mounting panel assembly 100, wherein different types of mounting means 14 are secured to the mounting panel 102. In FIG. 11A, the mounting means 14 is a magnet. In FIG. 11B, the mounting means 14 is an adhesive pad. In FIG. 11F, the mounting means 14 is hook and loop fastener material. Note that in FIG. 11A and FIG. 11B, and FIG. 11F the mounting means 14 sits within the mounting means retention slot 14R so that it is substantially coplanar with the rear 102R of the mounting panel 102. Accordingly, when the mounting panel 102 is installed, the mounting means 14 will be coplanar with the rear face 12R of the backing panel 12 (not shown).

Figure 11C:
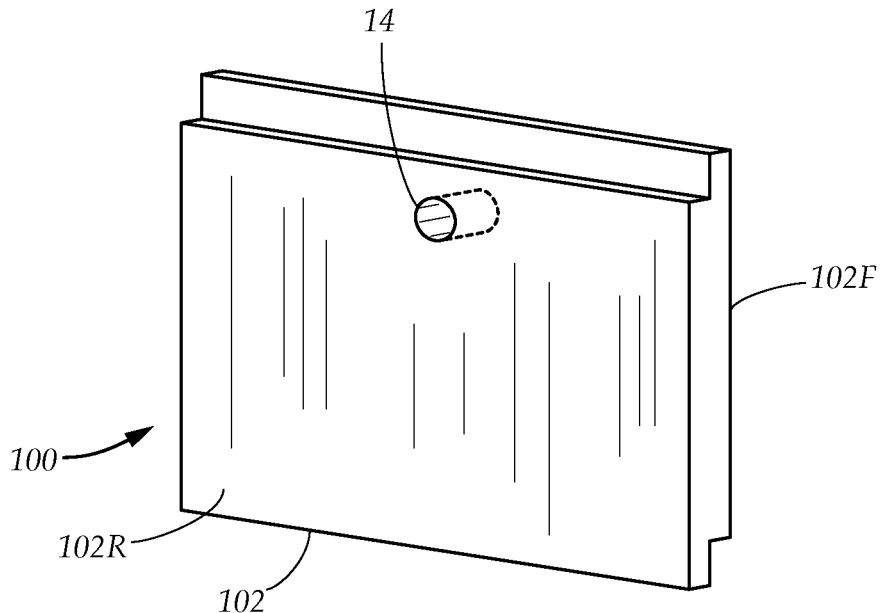
FIG. 11C is a diagrammatic depiction, showing the mounting panel, wherein the mounting means is a thru hole that facilitates securing the mounting panel by extending a fastener therethrough.
Figure 11D:
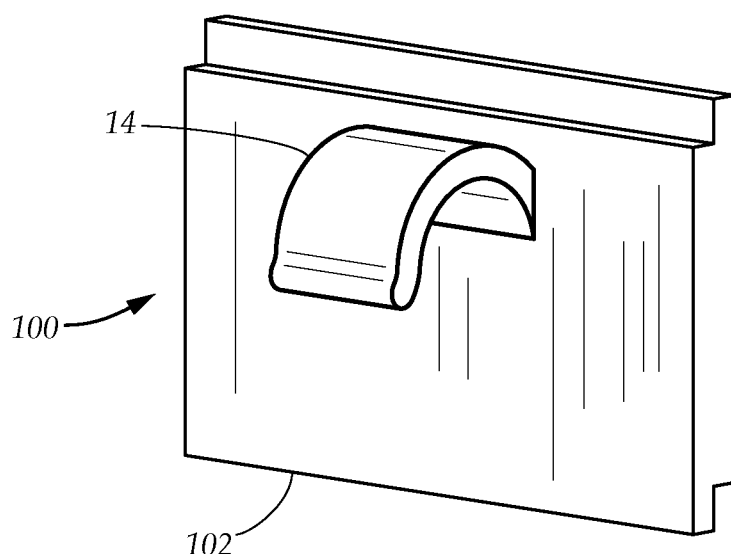
FIG. 11D is a diagrammatic depiction, showing the mounting panel, wherein the mounting means is a downturned hook.
Figure 11E:
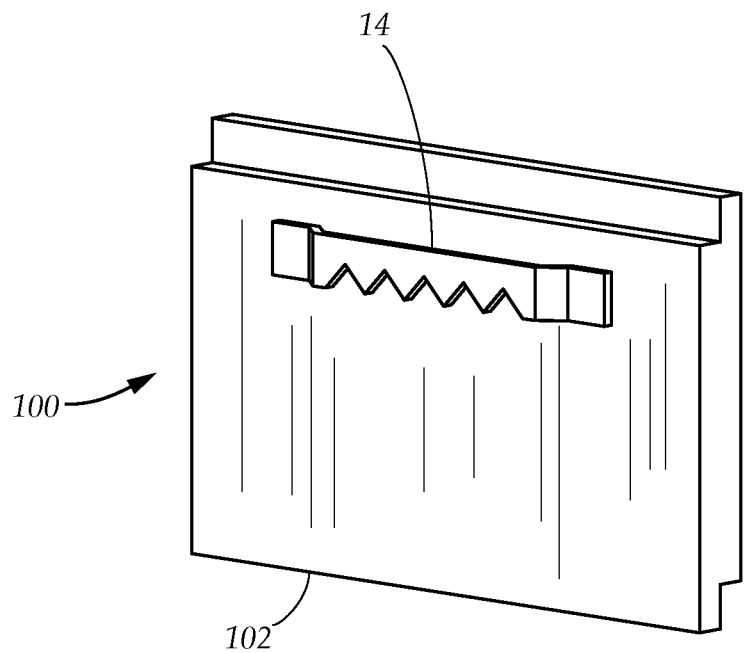
FIG. 11E is a diagrammatic depiction, showing the mounting panel, wherein the mounting means is a sawtooth picture hanger.
Figure 11F:
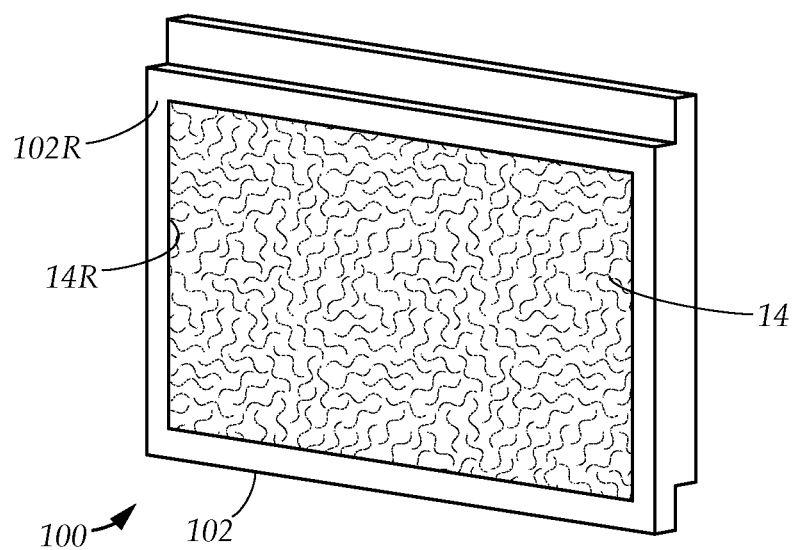
FIG. 11F is a diagrammatic depiction, showing the mounting panel, wherein the mounting means is hook and loop fastener material.

In FIG. 11C, the mounting means 14 is a thru hole that extends fully between the front 102F and rear 102R of the mounting panel 102. This allows a fastener such as a nail, screw, tack, or the like, to be extended through the mounting panel 102 to attach to suitable vertical surfaces. In FIG. 11D, the mounting means 14 is a downturned hook that can be used to fasten onto a horizontal bar or the like. In FIG. 11E, the mounting means 14 is a sawtooth picture hanger, that can be supported upon a nail, a picture hanging hook, or the like.

Advantageously, at least two, or a plurality of mounting panel assemblies 102 can be supplied as part of the mobile device holder. The mounting panel assemblies may be interchanged to facilitate attachment to different surfaces. A mounting panel assembly 102 having a magnet (as in FIG. 11A) can of course be used when the vertical surface is a ferromagnetic surface. For non-ferromagnetic vertical surfaces, other mounting panel assemblies 102, such as those shown in FIG. 11B thru FIG. 11F can be used to attach using adhesives, hook and loop fasteners, etc.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a mobile device holder. The disclosure is illustrated by example in the drawing figures, and throughout the written description. It should be understood that numerous variations are possible, while adhering to the inventive concept. Such variations are contemplated as being a part of the present disclosure.

What is claimed is:

1. A mobile device holder adapted for holding a mobile device, the mobile device having a mobile device top portion, a mobile device lower portion, and a mobile device body extending therebetween, the mobile device holder is further adapted to be detachably secured to a vertical mounting surface, the mobile device holder comprising:
    a backing panel having a front face and a rear face disposed opposite thereof and a pair of sides;
    a mounting panel assembly including a mounting means and a mounting panel having a front and a rear, the mounting panel assembly is selectively attached to the backing panel with the rear of the mounting panel substantially coplanar with the rear face of the backing panel, the mounting means is located at the rear of the mounting panel and is adapted to allow the backing panel to be detachably secured to the vertical mounting surface when the mounting panel is attached to the backing panel; and
    a basket portion having a basket front, a pair of basket sides, a basket base panel, and an upwardly basket opening disposed opposite the basket base panel, the basket portion further having a basket retaining space which is defined between the basket front, the basket sides, the basket base panel, and the basket opening, the basket base panel having a base panel rear edge in contact with the front face of the backing panel and a front edge oriented away from the backing panel, the basket base panel projecting forwardly away from the backing panel and tilted downwardly at a basket tilt angle in relation to a horizontal line drawn from the base panel rear edge, the basket sides having a pair of upper side supports projecting away from the front face of the backing panel and terminating at upper side support ends, the basket front having a pair of front side supports extending from the pair of upper side support ends to the front edge of the base panel at an acute angle in relation to the upper side support ends, the basket opening adapted to allow the mobile device to be inserted into the basket retaining space to be retained at an angle therein;
    a charging plug centered and extending upwardly from the basket base panel, adapted for mating with the mobile device;
    a charger receptacle located on one of the sides of the backing panel, adapted for attaching to a charging cable; and
    a connecting cable, electrically connecting the charging plug and charger receptacle.

2. The mobile device holder as described in claim 1, wherein the basket portion is tilted forwardly away from the rear face of the backing panel, and the basket base panel is adapted to support the mobile device lower portion; and wherein the rear of the mounting panel has a mounting means retention slot, and wherein the mounting means extends within the mounting means retention slot so that the mounting means is substantially coplanar with the rear of the mounting panel.

3. The mobile device holder as described in claim 2, wherein:
    the backing panel further has a top edge, a lower edge distally oriented in relation to the top edge, and a pair of sides extending therebetween; and
    wherein the mobile device holder is further adapted to be employed with a second mobile device holder substantially identical to the mobile device holder, the mobile device holder and the second mobile device holder are adapted to form a contiguous modular arrangement upon the vertical mounting surface, whereupon the mobile device holder and the second mobile device holder are adapted to form a column configuration whereby the second mobile device holder is attached to the vertical mounting surface above the mobile device holder and the top edge of the backing panel of the mobile device holder contacts the lower edge of the backing panel of the second mobile device holder.

4. The mobile device holder as described in claim 3, wherein:
    the basket tilt angle ensures that the basket portion of the second mobile device holder does not obstruct the insertion or removal of the mobile device through the basket opening of the mobile device holder positioned therebelow.

5. The mobile device holder as described in claim 4, wherein:
    the vertical mounting surface is comprised of a ferrous material; and
    the mounting means comprises a magnet.

6. The mobile device holder as described in claim 5, wherein:
    the rear face of the backing panel further has a friction element adapted to frictionally engage the vertical mounting surface, the friction element is adapted to prevent the mobile device holder from sliding downwardly along the vertical mounting surface.

7. The mobile device holder as described in claim 6, wherein:
    the backing panel further has a backing panel upper portion extending between the top edge and the basket portion, the backing panel upper portion having an upper portion height;
    the basket front projects upwardly and perpendicularly away from the base panel front edge; and
    the backing panel upper portion creates a vertical distance between the base panel front edge of the second mobile device holder and the basket opening of the mobile device holder positioned therebelow in the column configuration, whereby the vertical distance ensures the basket portion of the second mobile device holder does not obstruct the basket opening of the mobile device holder.

8. The mobile device holder as described in claim 7, wherein:
the mounting means is positioned near the top edge of the backing panel; and
the friction element is positioned between the mounting means and the lower edge of the backing panel.

9. A method for storing a mobile device upon a vertical mounting surface, the mobile device having a mobile device top portion, a mobile device lower portion, and a mobile device body extending therebetween, the method comprising the steps of:
providing a mobile device holder having:
a mounting panel assembly having a mounting panel having a front and rear and a mounting means attached at the rear,
a backing panel having a front face and a rear face disposed opposite thereof, the rear face allowing the mounting panel assembly to selectively attach thereto and detachably secure the backing panel to the vertical mounting surface,
a basket portion having a basket front, a pair of basket sides, a basket base panel, and an upwardly basket opening disposed opposite the basket base panel, the basket portion further having a basket retaining space which is defined between the basket front, the basket sides, the basket base panel, and the basket opening, the basket base panel having a base panel rear edge in contact with the front face of the backing panel and a front edge oriented away from the backing panel, the basket base panel projecting forwardly away from the backing panel and tilted downwardly at a basket tilt angle in relation to a horizontal line drawn from the base panel rear edge, the basket sides having a pair of upper side supports projecting away from the front face of the backing panel and terminating at upper side support ends, the basket front having a pair of front side supports extending from the pair of upper side support ends to the front edge of the base panel at an acute angle in relation to the upper side support ends, and
a charging plug centered on and extending upwardly from the basket base panel;
attaching the mounting panel assembly to the backing panel with the mounting means of said mounting panel assembly located at the rear face of the backing panel;
detachably securing the mobile device holder to the vertical mounting surface, placing the rear face of the backing panel and the mounting means of the mobile device holder against the vertical mounting surface;
mating the mobile device with the charging plug by inserting the mobile device lower portion downwardly through the basket opening of the mobile device holder until the mobile device lower portion rests upon the basket base panel; and
storing the mobile device within the basket retaining space of the mobile device holder.

10. The method as described in claim 9, wherein:
the basket portion is tilted forwardly away from the rear face of the backing panel; and
the step of inserting the mobile device lower portion further comprises tilting the mobile device forwardly within the basket retaining space and resting the mobile device body against the basket front.

11. The method as described in claim 10, wherein:
the backing panel further has a top edge and a distally oriented lower edge;
the step of providing a mobile device holder is followed by the step of providing a second mobile device holder substantially identical to the mobile device holder;
the step of detachably securing the mobile device holder to the vertical mounting surface is preceded by the step of detachably securing the second mobile device holder to the vertical mounting surface, and placing the rear face of the backing panel and the mounting means of the second mobile device holder against the vertical mounting surface; and
the step of detachably securing the mobile device holder to the vertical mounting surface further comprises positioning the mobile device holder below the second mobile device holder, placing the top edge of the backing panel of the mobile device holder in contact with the lower edge of the backing panel of the second mobile device holder to achieve a column configuration.

12. The method as described in claim 11, wherein:
the rear face of the backing panel further has a friction element adapted to frictionally engage the vertical mounting surface; and
the step of storing the mobile device is followed by the step of:
frictionally engaging the vertical mounting surface using the friction element of the mobile device holder, and preventing the mobile device holder from sliding downwardly along the vertical mounting surface.

13. The method as described in claim 12, wherein:
the backing panel further has a backing panel upper portion extending between the top edge and the basket portion, the backing panel upper portion having an upper portion height; and
the step of detachably securing the mobile device holder to the vertical mounting surface further comprises creating a vertical distance between the base panel front edge of the second mobile device holder and the basket opening of the mobile device holder positioned therebelow, the vertical distance ensuring the basket portion of the second mobile device holder does not obstruct the basket opening of the mobile device holder.

14. The method as described in claim 13, wherein:
the basket front projects upwardly and perpendicularly from the base panel front edge; and
the step of detachably securing the mobile device holder to the vertical mounting surface is followed by the step of:
aligning the basket front of the second mobile device holder with an alignment plane which originates from the base panel rear edge of the mobile device holder and projects upwardly and perpendicularly in relation to the basket base panel of the mobile device holder.

15. The method as described in claim 14, wherein:
the backing panel further has a pair of sides which extend between the top edge and the lower edge; and
the steps as recited are followed by the step of:
detachably securing the mobile device holder to the vertical mounting surface in a row configuration, placing one of the sides of the mobile device holder in contact with one of the sides of the second mobile device holder.

16. The method as described in claim 15, further comprising:

a lower support extending from the lower edge of the backing panel to connect with the front edge of the base panel to reinforce and support the basket portion;
wherein:
the pair of upper side supports include a length greater than a length of the lower support such that the pair of upper side supports project further outwardly from the front face of the backing panel than does the lower support, and
the front side supports extends from the lower support to form an obtuse angle in relation to the lower support.

17. The method as described in claim 11, further comprising a lower support extending from the lower edge of the backing panel to connect with the front edge of the base panel to reinforce and support the basket portion;
wherein:
the pair of upper side supports include a length greater than a length of the lower support such that the pair of upper side supports project further outwardly from the front face of the backing panel than does the lower support, and
the front side supports extends from the lower support to form an obtuse angle in relation to the lower support.

\* \* \* \* \*